United States Patent Office.

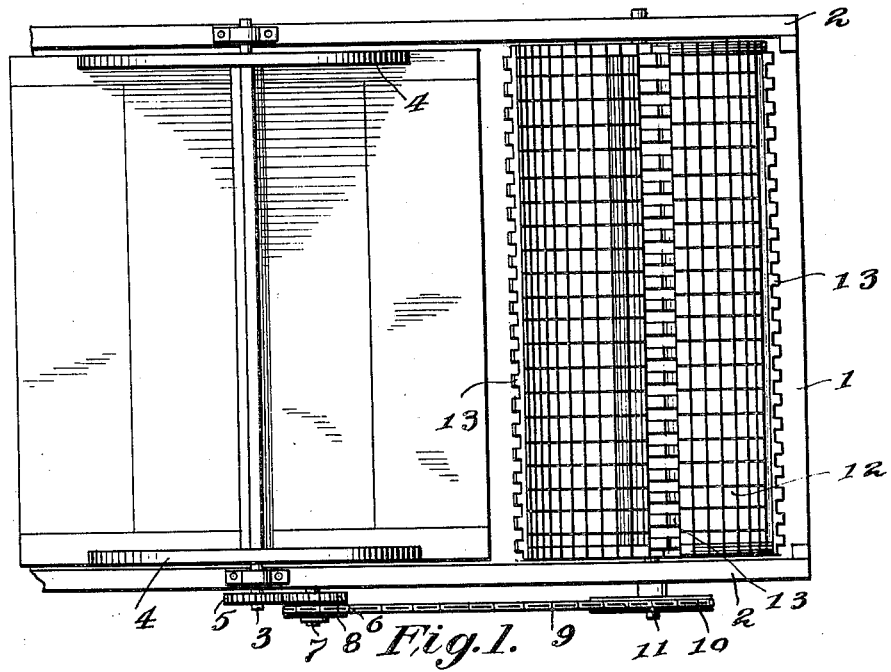

EVERETT KNIPE, OF EMMETT, IDAHO.

AUTOMATIC FISH-SCREEN.

1,054,566.

Specification of Letters Patent. Patented Feb. 25, 1913.

Application filed September 19, 1911. Serial No. 650,130.

*To all whom it may concern:*

Be it known that I, EVERETT KNIPE, a citizen of the United States, residing at Emmett, in the county of Canyon and State of Idaho, have invented new and useful Improvements in Automatic Fish-Screens, of which the following is a specification.

This invention relates to fish screens and more particularly to that type which are used in front of the fluid gates of reservoirs and irrigation ditches so as to prevent the fish in the reservoir from getting into the ditches.

The object of the invention is the provision of a simple and efficient device of this character which will automatically clean itself and which will discharge the collected debris thereof upon the opposite or down-stream side.

Further objects of the invention will appear as the following specific description is read in connection with the accompanying drawing, which forms a part of this application, and in which:—

Figure 1 is a top plan view. Fig. 2 is a side elevation. Fig. 3 is a section on the line 3—3 of Fig. 2.

In the specific embodiment of the invention illustrated herein, a chute box 1 is shown in the sides 2 of which is journaled a shaft 3 upon which a water wheel 4 is mounted. The shaft of this wheel extends beyond one side of the box and has secured thereto a gear wheel 5 which meshes with a similar gear wheel 6 upon the stub shaft 7 which also carries a sprocket wheel 8. This sprocket wheel 8 is connected by means of a sprocket chain 9 to a somewhat larger sprocket wheel 10 keyed to the shaft 11 which is journaled in the sides of the box and carries a screen drum 12. This screen drum extends entirely across the box and has a diameter slightly greater than the top thereof.

Projecting outwardly of the periphery of the drum at quartering intervals are longitudinal series of teeth 13 which pass between similar teeth 14 projecting upwardly from the bottom of the box. These teeth pick up the debris which collects upon the bottom of the box and upon the drum and carry the same up over the drum to the distributing point in the water upon the downstream side of the drum, thereby cleaning the drum and permitting free passage of the water at all times. Any trash adhering to the drum upon the down-stream side will be washed free thereof by the water passing through the drum and the intermeshing teeth or projections 13 and 14 prevent the escape of the fish beneath the drum, as will be readily understood.

It will be noticed that the drum 12 rotates in the direction opposite that to the water wheel and in a direction opposite to the flow of the current.

Having thus described the invention, what I claim as new is:—

1. In combination, a chute box, a screen drum journaled thereacross, means for driving said screen drum in opposition to the current traveling through the box, teeth projecting up from the box, and intermeshing teeth on the drum.

2. In combination, a chute box, a screen drum journaled thereacross, teeth projecting up from the box in close proximity to the drum to prevent passage of animate or inanimate objects between the drum and the box, means carried by the drum for carrying debris and the like over the drum, a water wheel journaled in the box, and a driving connection between the water wheel and the drum which rotates the latter in an opposite direction to the current traveling in the box.

In testimony whereof I affix my signature in presence of two witnesses.

EVERETT KNIPE.

Witnesses:
V. T. CRAIG,
GEO. D. KNIPE.